April 21, 1931.　　　C. C. WILSON　　　1,802,322

CIRCUIT MAKER AND BREAKER

Original Filed July 2, 1928

INVENTOR.
C. C. Wilson
BY
ATTORNEY.

Patented Apr. 21, 1931

1,802,322

UNITED STATES PATENT OFFICE

CHARLES CLEVELAND WILSON, OF KINGS MOUNTAIN, NORTH CAROLINA

CIRCUIT MAKER AND BREAKER

Application filed July 2, 1928, Serial No. 289,918. Renewed March 16, 1931.

The invention relates to a novel circuit maker and breaker for use in block signalling systems of the type used in connection with railroads, and has for its object to provide a device of this kind for controlling signalling lights in various positions for instance in the cab of an engine or to the road side.

A further object is to provide a slidably mounted circuit maker and breaker carried by the train above contact rails, and dash pot controlled, and moved vertically for closing circuits by one of the arms of T shaped levers, spring controlled and having depending arms in the path of the contact rails whereby upon engagement with the contact rails they will be pivotally moved for closing circuit through the wiring which leads to various signal lights either on the engine or to the side of the road.

A further object is to mount the slidable circuit maker and breaker and the other mechanical parts on a single plate, whereby it may be applied to a train as a unit.

A further object is to form the slidable circuit maker and breaker from a rectangular shaped frame slidably mounted on clips, and to pivotally connect the body of the dash pot to the plate within the frame, and the piston rod of the dash pot to the upper end of the frame whereby the dash pot action will be localized centrally of the frame, protected within the frame, and space conserved.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

Figure 1:
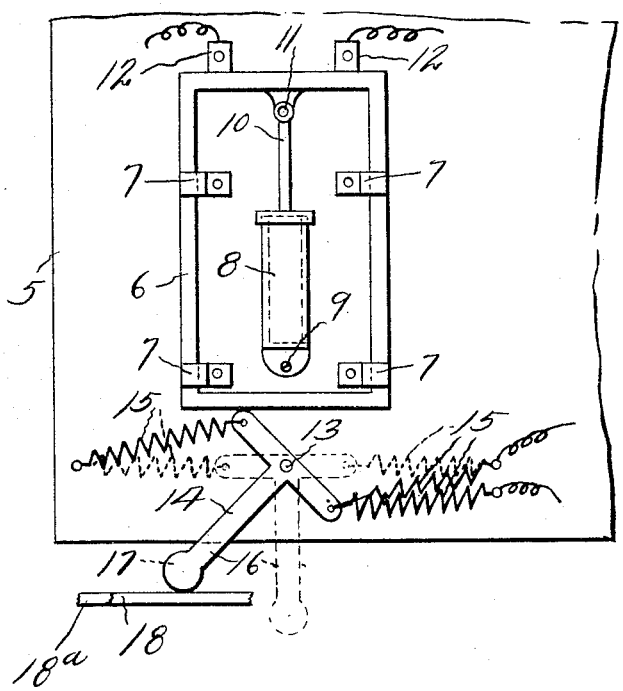
Figure 1 is a view in elevation of the circuit maker and breaker.
Figure 2:
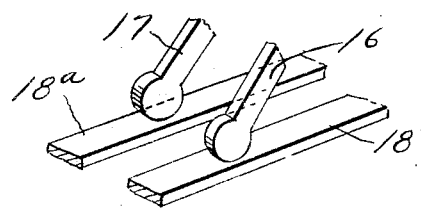
Figure 2 is a perspective view of portions of the conductor rails showing portions of the pivoted arms.
Figure 3:
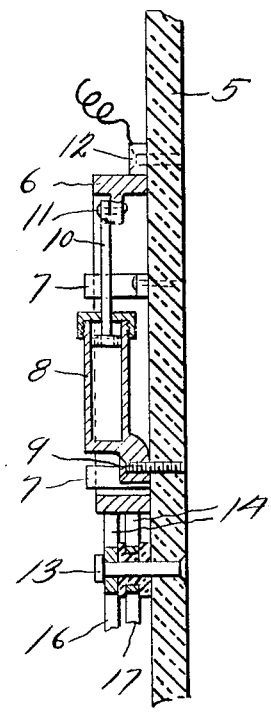
Figure 3 is a vertical transverse sectional view through the dash pot controlled circuit maker and breaker.

Referring to the drawing, the circuit maker and breaker is preferably mounted on a single plate 5, which may be secured to an engine in any suitable manner, and in a vertical position. Slidably mounted on the plate 5 is a rectangularly shaped frame 6, formed from conductor material, and which frame is slidably mounted in the brackets 7, which guide the frame in its upward and downward movement. To prevent too rapid a movement in an upward and downward direction of the frame 6, the dash pot 8 is provided within the frame, and which dash pot has its lower end pivotally connected at 9 to the plate 5 and its piston rod 10 pivotally connected at 11 to the upper end of the frame. The upper end of the frame 6 closes a circuit through the contacts 12 in the path thereof.

Pivotally mounted on a pin 13 beneath the slidable frame 6 are T shaped levers 14, the opposite arms of which have connected thereto anchored coiled springs 15, which springs normally maintain the depending arms 16 and 17 of the levers in vertical positions where as the train advances the arms 16 and 17 will be in the path of the conductor rails 18 and 18a, which will rock the T-shaped levers for cooperating with slidable frame 6 and raising the same. It will be noted that the entire circuit maker and breaker will be supported on the single plate 5, which plate may be applied to an engine as a unit, thereby obviating the necessity of modifying the construction in applying the device. By providing the dash pot 8, the shock incident to sudden upward or downward movement of the frame 6 is absorbed, and by locating the dash pot within the frame 6, its action is central in relation to the frame, and at the same time the dash pot is protected to a great extent by the frame.

From the above it will be seen that a circuit maker and breaker is provided, particularly adapted for use in connection with train signalling and control systems, and one which may be easily and quickly applied to a train without modifying the construction thereof.

The invention having been set forth what is claimed as new and useful is:

1. A circuit maker and breaker for train block signalling systems, said circuit maker and breaker comprising a vertically disposed support adapted to be carried by a train, a frame slidably mounted on said support and vertically movable, contacts above said frame, T-shaped pivoted arms beneath said frame, springs connected to the opposite arms of the T-shaped levers and normally maintaining the same in horizontal position, and means for rocking said T-shaped pivoted arm.

2. A train block system circuit maker and breaker comprising a slidable frame, pivoted members beneath the frame, said pivoted members when rocked forming means whereby the slidable member is forced to circuit closing position and dash pot means carried by the slidable member and forming means whereby the sudden operation of the slidable member is checked.

3. A train control system circuit maker and breaker, said circuit maker and breaker comprising a vertical support, a vertically movable rectangular shaped frame slidably mounted on the support, clips within the frame and secured to the support and forming guides for the frame, a dash pot disposed within the frame and carried by the support, a piston rod carried by the dash pot and connected to the frame, and rockable members pivotally mounted below the frame and forming means whereby said frame is slidably moved upwardly.

4. A train control system circuit maker and breaker, said circuit maker and breaker comprising a vertically disposed horizontally movable support, contacts at the upper ends of said support, a rectangularly shaped frame vertically slidable on the support, said frame being movable downwardly by gravity, a plurality of contact rails horizontally disposed beneath the support, a dash pot carried by the support within the plane of the rectangular frame, a T-shaped pair of arms pivoted to the support beneath the frame, one of said arms depending into positions where they will be engaged by the contact rails for rocking the T-shaped arms, and the other arms of the T-shaped arms forming means cooperating with the rectangular frame for raising and lowering said frame, said arms having connected thereto contractable springs normally returning the T-shaped arms to vertical position after an actuation thereof.

5. A train control system circuit maker and breaker comprising a vertically movable gravity return member, said member being slidably mounted on a support, contacts above the slidable member on the support and adapted to be engaged by the slidable member, a dash pot carried by the support and controlling the gravity return of the slidable member, contact rails beneath the support and slidable member and T-shaped rocker arms carried by the support beneath the slidable member and cooperating with the lower end of the slidable member for raising the slidable member upon rocking of the T-shaped members in either direction.

In testimony whereof I hereunto affix my signature.

CHARLES CLEVELAND WILSON.